(12) United States Patent
Suenobu et al.

(10) Patent No.: US 9,844,768 B2
(45) Date of Patent: Dec. 19, 2017

(54) HONEYCOMB CATALYST BODY

(71) Applicant: NGK Insulators, Ltd., Nagoya (JP)

(72) Inventors: Hiroyuki Suenobu, Nagoya (JP); Shogo Hirose, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/175,256

(22) Filed: Jun. 7, 2016

(65) Prior Publication Data

US 2016/0288095 A1  Oct. 6, 2016

Related U.S. Application Data

(62) Division of application No. 14/190,152, filed on Feb. 26, 2014, now abandoned.

(30) Foreign Application Priority Data

Mar. 29, 2013 (JP) .................. 2013-073191

(51) Int. Cl.
- *B01D 53/94* (2006.01)
- *B01J 21/04* (2006.01)
- *B01J 21/16* (2006.01)
- *B01J 23/30* (2006.01)
- *B01J 29/85* (2006.01)
- *B01J 35/04* (2006.01)

(Continued)

(52) U.S. Cl.
CPC .......... *B01J 23/30* (2013.01); *B01D 53/9418* (2013.01); *B01J 21/04* (2013.01); *B01J 21/16* (2013.01); *B01J 23/002* (2013.01); *B01J 23/22* (2013.01); *B01J 29/85* (2013.01); *B01J 35/04* (2013.01); *B01J 37/0244* (2013.01); *B01J 37/0246* (2013.01); *C04B 38/0006* (2013.01); *B01D 2255/2092* (2013.01);

(Continued)

(58) Field of Classification Search
None
See application file for complete search history.

(56) References Cited

U.S. PATENT DOCUMENTS 5,116,586 A    5/1992  Baacke et al.
6,959,540 B2  11/2005  Itoh et al.

(Continued)

FOREIGN PATENT DOCUMENTS

EP   2 399 670   12/2011
EP   2 505 252   10/2012

(Continued)

OTHER PUBLICATIONS

Japanese Office Action (Application No. 2013-073191) dated Apr. 21, 2015.

(Continued)

Primary Examiner — Colin W. Slifka
(74) Attorney, Agent, or Firm — Burr & Brown, PLLC

(57) ABSTRACT

The honeycomb catalyst body is equipped with a honeycomb structure body having partition walls that define a plurality of cells extending from a first end face as one of the end faces to a second end face as the other end face and serving as through channels of a fluid. The partition walls each have a base layer containing from 50 to 90 mass % of zeolite and a coat layer with which the surface of the base layer 11 is coated with a thickness of from 1 to 50 μm. The coat layer is either a coat layer (A) containing from 1 to 5 mass % vanadia and titania or a coat layer (B) containing from 1 to 5 mass % vanadia and a composite oxide of titania and tungsten oxide.

9 Claims, 3 Drawing Sheets

(51) Int. Cl.
    *B01J 37/02*     (2006.01)
    *B01J 23/00*     (2006.01)
    *B01J 23/22*     (2006.01)
    *C04B 38/00*     (2006.01)
    *B01J 29/076*     (2006.01)
    *B01J 29/42*     (2006.01)
    *B01J 29/66*     (2006.01)
    *B01J 29/72*     (2006.01)
    *B01J 35/00*     (2006.01)
    *B01J 37/00*     (2006.01)
    *C04B 111/00*     (2006.01)

(52) U.S. Cl.
    CPC .............. *B01D 2255/20707* (2013.01); *B01D 2255/20723* (2013.01); *B01D 2255/20761* (2013.01); *B01D 2255/20776* (2013.01); *B01D 2255/50* (2013.01); *B01J 29/076* (2013.01); *B01J 29/42* (2013.01); *B01J 29/66* (2013.01); *B01J 29/723* (2013.01); *B01J 29/7215* (2013.01); *B01J 35/002* (2013.01); *B01J 37/0018* (2013.01); *B01J 2229/186* (2013.01); *B01J 2229/42* (2013.01); *B01J 2523/00* (2013.01); *C04B 2111/0081* (2013.01)

(56) References Cited

U.S. PATENT DOCUMENTS

| | | |
|---|---|---|
| 2004/0166035 A1 | 8/2004 | Noda et al. |
| 2005/0034450 A1 | 2/2005 | Itoh et al. |
| 2005/0069477 A1 | 3/2005 | Hong et al. |
| 2005/0204729 A1 | 9/2005 | Itoh et al. |
| 2005/0217248 A1 | 10/2005 | Itoh et al. |
| 2005/0217249 A1 | 10/2005 | Itoh et al. |
| 2005/0262829 A1 | 12/2005 | Itoh et al. |
| 2005/0262832 A1 | 12/2005 | Itoh et al. |
| 2007/0248517 A1 | 10/2007 | Nagata et al. |
| 2009/0143221 A1 | 6/2009 | Ogunwumi et al. |
| 2010/0160158 A1 | 6/2010 | Ando et al. |
| 2011/0044873 A1 | 2/2011 | Ahn et al. |
| 2012/0040824 A1 | 2/2012 | Itou et al. |
| 2014/0157763 A1 | 6/2014 | Chandler et al. |

FOREIGN PATENT DOCUMENTS

| | | |
|---|---|---|
| JP | S61-242911 A | 10/1986 |
| JP | 2002-095912 A | 4/2002 |
| JP | 2008-246472 A1 | 10/2008 |
| JP | 2010-214308 A | 9/2010 |
| JP | 2010-253447 A | 11/2010 |
| JP | 2011-207749 A | 10/2011 |
| JP | 2012-213755 A | 11/2012 |
| WO | 99/67511 A1 | 12/1999 |
| WO | 2013/017873 A1 | 2/2013 |

OTHER PUBLICATIONS

Japanese Office Action (With English Translation), Japanese Application No. 2013-073191, dated Aug. 25, 2015 (5 pages).
German Examination Report (With English Translation), German Application No. 10 2014 002 751.1, dated Oct. 29, 2015 (7 pages).
Japanese Office Action (With English Translation), Japanese Application No. 2013-073191, dated Jan. 26, 2016 (4 pages).

HONEYCOMB CATALYST BODY

CROSS-REFERENCE TO RELATED APPLICATIONS

The present application is a Divisional of U.S. patent application Ser. No. 14/190,152, filed Feb. 26, 2014, and claims the benefit under 35 USC §119(a)-(d) of JP 2013-073191 filed on Mar. 29, 2013, the entireties of which are incorporated herein by reference.

BACKGROUND OF THE INVENTION

1. Field of the Invention

The present invention relates to a honeycomb catalyst body. More specifically, the invention relates to a honeycomb catalyst body having zeolite and vanadia loaded thereon and usable for selective catalytic reduction (SCR) of $NO_x$.

2. Description of Related Art

An exhaust gas discharged from internal combustion engines including automotive engines contains harmful substances such as carbon monoxide (CO), hydrocarbon (HC), and nitrogen oxide ($NO_x$). For reducing such a harmful substance and thereby purifying an exhaust gas, a catalytic reaction has been used widely. In gasoline engines, a ternary catalyst has been used generally which maintains a mixing ratio (air fuel ratio) of air and a fuel at a theoretical air fuel ratio, bringing CO, HC, and $NO_x$ in an exhaust gas into contact with a noble metal catalyst such as platinum or rhodium to convert them into harmless $CO_2$, $H_2O$, and $N_2$.

A ternary catalyst is not suited for use in diesel engines because in general, an amount of air is excessive relative to the amount of a fuel and the air fuel ratio cannot therefore be maintained at a theoretical air fuel ratio. An oxidation catalyst for reacting CO and HO with $O_2$ in the excessive air to convert them into harmless $CO_2$ and $H_2O$ can be used, but it cannot reduce $NO_x$ into $N_2$ in an oxygen-excess exhaust gas atmosphere of diesel engines. For diesel engines, therefore, a countermeasure against $NO_x$ has been a big issue to be solved.

Examples of a technology of reducing $NO_x$ in an oxygen-excess atmosphere include selective catalytic reduction (SCR). Selective catalytic reduction (SCR) is a technology of reacting $NO_x$ with ammonia ($NH_3$) and thereby converting it into $N_2$ and $H_2O$ and it has conventionally been used as an exhaust gas treatment system in thermal power plants and the like. In recent years, application of a technology making use of selective catalytic reduction (SCR) to diesel engines for vehicles has been underway. Loading of $NH_3$ on vehicles is however dangerous so that reduction of $NO_x$ is conducted by loading a tank filled with an aqueous urea solution on the vehicles, injecting the solution into the exhaust gas to hydrolyze it at a high temperature and obtain an $NH_3$ gas, and using the resulting $NH_3$ for the reduction.

In the exhaust gas treatment system in thermal power plants and the like, a titania-vanadia catalyst is used for reacting $NO_x$ with $NH_3$. The titania-vanadia catalyst has two types, that is, coat type and solid type. Similar to ternary catalysts or oxidation catalysts for automotive engines, the coat type is obtained by loading titania and vanadia on a ceramic honeycomb carrier. The solid type is obtained by forming titania and vanadia themselves into a honeycomb structure. In recent years, most of the titania-vanadia catalysts have been a solid type. Although catalysts similar to those used in an exhaust gas treatment system of thermal power plants and the like can also be used for diesel engines for vehicles, the titania-vanadia catalyst require a large volume in order to achieve highly-efficient $NH_3$ purification. Using the titania-vanadia catalyst for vehicles is not recommended. There is therefore a demand for a catalyst for vehicles that can be down sized and has a higher efficiency.

Catalysts more efficient than titania-vanadia catalysts include metal-substituted zeolites (such as copper ion-exchanged zeolite and iron ion-exchanged zeolite). Similar to titania-vanadia catalysts, the metal-substituted zeolite catalysts have a coat type and a solid type. Catalysts for vehicles are fixed in a metal container via a heat-resistant cushioning material. In order to prevent catalysts from moving due to vibration of vehicles, catalysts are retained by a friction power while applying a compressive force. The catalysts should therefore have mechanical strength enough to withstand the compressive force. The coat type (zeolite-loaded honeycomb catalyst body) does not have a large problem in strength because a ceramic honeycomb carrier has mechanical strength. In the solid type (zeolite structural body), on the other hand, a honeycomb structure should be made of zeolite. An inorganic binder for binding zeolite particles to each other or an aggregate or fiber for keeping its strength should be added to zeolite (for example, Patent Documents 1 and 2).

[Patent Document 1] JP-A-2012-213755
[Patent Document 2] JP-A-2011-207749

SUMMARY OF THE INVENTION

The above-mentioned zeolite-loaded honeycomb catalyst body and zeolite structural body however are likely to deteriorate due to the reaction of zeolite with sulfur contained in an exhaust gas. In addition to this problem, the above-mentioned zeolite-loaded honeycomb catalyst body and zeolite structural body break easily because zeolite exhibits high water absorption so that it repeats expansion due to water absorption and shrinkage due to desorption of water.

With the foregoing problem in view, an object of the invention is to provide a honeycomb catalyst body containing zeolite as a catalyst and capable of suppressing deterioration of zeolite due to sulfur and breakage caused by absorption and desorption of water by zeolite.

According to a first aspect of the present invention, a honeycomb catalyst body equipped with a honeycomb structure body having partition walls that define a plurality of cells extending from a first end face is provided, that is, one of the end faces, to a second end face, that is, the other end face and serving as through channels of a fluid, the partition walls each having a base layer containing from 50 to 90 mass % of zeolite and a coat layer with which the surface of the base layer is coated with a thickness of from 1 to 50 µm, and the coat layer being either a coat layer (A) containing from 1 to 5 mass % vanadia and titania or a coat layer (B) containing from 1 to 5 mass % vanadia and a composite oxide of titania and tungsten oxide.

According to a second aspect of the present invention, a honeycomb catalyst body equipped with a honeycomb structural body having partition walls that define a plurality of cells extending from a first end face is provided, that is, one of the end faces, to a second end face, that is, the other end face, and serving as through channels of a fluid, the partition walls each having a support layer composed mainly of ceramics, an intermediate layer with which the surface of the support layer is coated and that contains from 50 to 95 mass % of zeolite, and a coat layer with which the surface of the intermediate layer is coated, and the coat layer being either a coat layer (A) containing from 1 to 5 mass % vanadia and titania or a coat layer (B) containing from 1 to 5 mass % vanadia and a composite oxide of titania and tungsten oxide.

According to a third aspect of the present invention, the honeycomb catalyst body as described above in the first or second aspects is provided, wherein the honeycomb structure body has an effective GSA (geometrical surface area) of from 10 to 50 cm$^2$/cm$^3$.

According to a fourth aspect of the present invention, the honeycomb catalyst body as described above in any of the first to third aspects is provided, wherein a ratio of the mass of the zeolite to a total of the mass of the vanadia and the mass of the titania in the coat layer (A) {(mass of zeolite):(total of mass of vanadia and mass of titania)} contained in the honeycomb structure body is from 99:1 to 60:40; or a ratio of the mass of the zeolite to a total of the mass of the vanadia, the mass of the titania, and the mass of the tungsten oxide in the coat layer (B) {(mass of zeolite):(total of mass of vanadia, mass of titania, and mass of tungsten oxide)} contained in the honeycomb structure body is from 99:1 to 60:40.

According to a fifth aspect of the present invention, the honeycomb catalyst body as described above in any of the first to fourth aspects is provided, wherein the honeycomb structure body has a thermal expansion coefficient at from 40 to 800° C. of 1.0 ppm/K or less.

According to a sixth aspect of the present invention, the honeycomb catalyst body as described above in any of the first to fifth aspects is provided, wherein the coat layer contains from 1 to 30 mass % of an inorganic binder which does not disappear at 500° C. or less.

The honeycomb catalyst body of the present invention can suppress deterioration of zeolite due to sulfur or breakage of zeolite due to its absorption and desorption of water because the surface of the zeolite-containing partition wall is coated with a vanadia-containing coat layer.

DETAILED DESCRIPTION OF THE PRESENT INVENTION

Embodiments of the invention will next be described referring to some drawings. The invention is not limited to or by the following embodiments and it can be changed, modified or improved without departing from the scope of the invention.

1. First Mode of Honeycomb Catalyst Body

Figure 1:
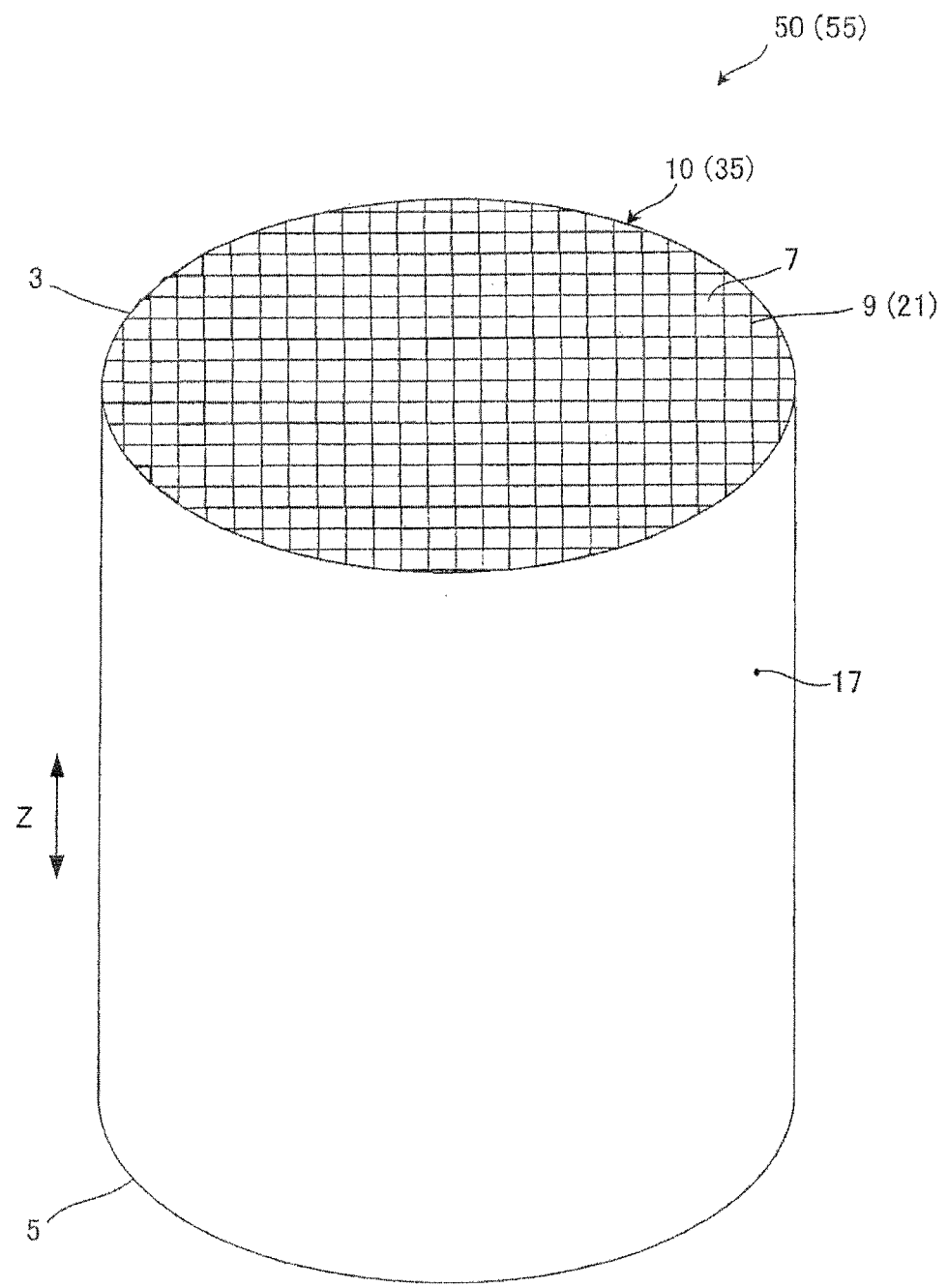
FIG. 1 is a schematic perspective view of a honeycomb catalyst body of one embodiment (or another embodiment) of the present invention viewed from the side of a first end face.
Figure 2:
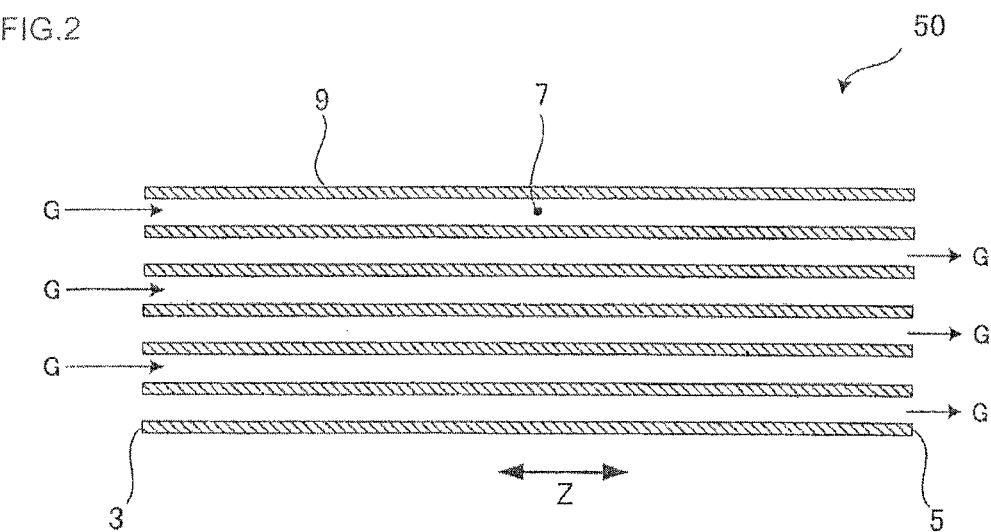
FIG. 2 is a schematic view of a portion of the cross-section of the honeycomb catalyst body of the one embodiment of the present invention parallel to an extending direction of a cell.
Figure 3:
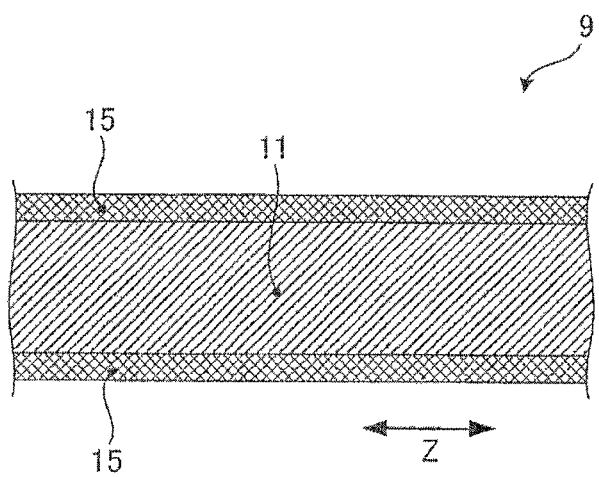
FIG. 3 is an enlarged schematic view of the cross-section of a partition wall of the honeycomb catalyst body of the one embodiment of the present invention.

As illustrated in FIGS. 1 to 3, a honeycomb catalyst body 50 of the present embodiment (first mode) is equipped with a honeycomb structure body 10. The honeycomb structure body 10 has partition walls 9 that define a plurality of cells 7 extending from a first end face 3 as one of the end faces to a second end face 5 as the other end face and serving as through channels of a fluid. The partition walls 9 each has a base layer 11 containing from 50 to 90 mass % of zeolite and a coat layer 15 with which the surface of the base layer 11 is coated with a thickness of from 1 to 50 μm. The coat layer 15 is a coat layer (A) containing from 1 to 5 mass % vanadia and titania or a coat layer (B) containing from 1 to 5 mass % vanadia and a composite oxide of titania and tungsten oxide. FIG. 1 is a schematic perspective view of the honeycomb catalyst body 50 of the one embodiment (first mode) of the present invention viewed from the side of a first end face 3. FIG. 2 is a schematic view of a portion of the cross-section of the honeycomb catalyst body 50 of the one embodiment of the present invention parallel to an extending direction (which will be called "direction z", simply) of the cells 7. FIG. 3 is an enlarged schematic view of the cross-section of the partition wall 9 of the honeycomb catalyst body 50 of the one embodiment of the present invention.

Since in the honeycomb catalyst body 50, the zeolite-containing base layer 11 is coated with the vanadia-containing coat layer 15, sulfur or water is not easily brought into contact with zeolite contained in the base layer 11, making it possible to suppress deterioration or breakage of the base layer 11. Described specifically, the vanadia-containing coat layer 15 serves to suppress deterioration of zeolite contained in the base layer 11 which would otherwise occur due to contact with sulfur. In addition, the vanadia-containing coat layer 15 serves to suppress absorption and desorption of water to and from zeolite contained in the base layer 11 which would otherwise occur due to contact with water. As a result, expansion of zeolite due to absorption of water and shrinkage of zeolite due to desorption of water can be suppressed and therefore, the breakage of the base layer 11 can be suppressed.

The base layer 11 of the honeycomb catalyst body 50 usually contains from 50 to 90 mass % of zeolite. When the zeolite is contained in the base layer 11 in an amount less than 50 mass %, the catalyst performance imparted by zeolite may be poor. When the zeolite is contained in the base layer 11 in an amount exceeding 90 mass %, on the other hand, the partition walls 9 have reduced strength. The amount of the zeolite contained in the base layer 11 is preferably from 55 to 90 mass %. In particular, it is more preferably from 60 to 85 mass %.

The zeolite contained in the base layer 11 is preferably zeolite exchanged with a metal ion and therefore having the metal ion. The metal ion which the zeolite has is preferably at least one metal ion selected from the group consisting of an iron ion, a copper ion, and a silver ion. When the catalyst is used for removing NO$_x$, metal ions containing at least an iron ion and a copper ion are preferred. When the catalyst is used for adsorbing a hydrocarbon thereto, on the other hand, metal ions containing at least a silver ion and a copper ion are preferred.

Examples of the zeolite contained in the base layer 11 include ZSM-5, β-zeolite, SAPO34, chabazite, and ferrierite. Of these, chabazite and β-zeolite are preferred because they have good purification performance and good adsorption performance.

The coat layer 15 of the honeycomb catalyst body 50 usually contains from 1 to 5 mass % of vanadia. When the amount of the vanadia contained in the coat layer 15 is less than 1 mass %, the resulting catalyst body may be inferior in NO$_x$ purification performance. When the amount of the vanadia contained in the coat layer 15 exceeds 5 mass %, on the other hand, the resulting catalyst may be inferior in NO purification performance because due to accelerated oxidation of $SO_2$ and an increased production amount of $SO_3$, ammonium sulfate, which is a reaction product with $NH_3$, clogs the pores of the catalyst therewith. The amount of the vanadia contained in the coat layer 15 is preferably from 1.5 to 4.5 mass %. In particular, it is more preferably from 2.0 to 4.0 mass %.

The thickness of the coat layer 15 of the honeycomb catalyst body 50 is usually from 1 to 50 μm. When the thickness of the coat layer 15 is less than 1 μm, the coat layer may be inferior in its effect of suppressing sulfur or water from contacting with the base layer 11. When the thickness of the coat layer 15 exceeds 50 μm, on the other hand, a pressure loss may increase. The thickness of the coat layer 15 is preferably from 3 to 45 μm, more preferably from 5 to 40 μm. In particular, it is most preferably from 7 to 35 μm. The term "thickness of the coat layer 15" means the width of the coat layer 15 at the cross-section of the honeycomb catalyst body 50 perpendicular to the direction z.

When the coat layer 15 is the above-mentioned "coat layer (A)", it contains "composite particles (i)" having titania particles and vanadia particles attached to the surface thereof (which will hereinafter be called "composite particles (i)" simply). Since the coat layer 15 contains the composite particles (i), the resulting catalyst body is excellent in $NO_x$ purification performance.

The average particle size of the titania particles contained in the above-mentioned "composite particles (i)" is preferably from 0.1 to 5 μm. When the average particle size of the titania particles contained in the "composite particles (i)" is less than 0.1 μm, the resulting catalyst body may be inferior in $NO_x$ purification performance due to a decrease in specific surface area caused by sintering. When the average particle size of the titania particles contained in the "composite particles (i)" exceeds 5 μm, on the other hand, the resulting catalyst body may be inferior in $NO_x$ purification performance. The average particle size of the titania particles contained in the "composite particles (i)" is more preferably from 0.2 to 4 μm. In particular, it is most preferably from 0.3 to 3 μm.

A "ratio of the mass of titania to the mass of vanadia" {(mass of titania)/(mass of vanadia)} in the above-mentioned "composite particles (i)" is preferably from 19 to 99. When the above-mentioned "ratio of the mass of titania to the mass of vanadia" is less than 19, the resulting catalyst body may be inferior in $NO_x$ purification performance because due to accelerated oxidation of $SO_2$ and an increased production amount of $SO_3$, ammonium sulfate, which is a reaction product with $NH_3$, clogs the pores of the catalyst therewith. When the above-mentioned "ratio of the mass of titania to the mass of vanadia" exceeds 99, on the other hand, the resulting catalyst body may be inferior in $NO_x$ purification performance. The above-mentioned "ratio of the mass of titania to the mass of vanadia" is more preferably from 21 to 66. In particular, it is most preferably from 24 to 49.

When the coat layer 15 is the above-mentioned "coat layer (B)", it contains "composite particles (ii)" having "composite oxide particles" containing a composite oxide of titania and tungsten oxide (which composite oxide particles will hereinafter be called "composite oxide particles", simply) and vanadia particles attached to the surface of the composite oxide particles (which composite particles will hereinafter be called "composite particles (ii)", simply). The coat layer 15 contains the composite particles (ii) so that the resulting catalyst body is excellent in $NO_x$ purification performance.

The average particle size of the above-mentioned "composite oxide particles" is preferably from 0.1 to 5 μm. When the average particle size of the "composite oxide particles" is less than 0.1 μm, the resulting catalyst body may be inferior in $NO_x$ purification performance due to a decrease in specific surface area caused by sintering. When the average particle size of the "composite oxide particles" exceeds 5 μm, on the other hand, the resulting catalyst body may be inferior in $NO_x$ purification performance. The average particle size of the "composite oxide particles" is more preferably from 0.2 to 4 μm. In particular, it is most preferably from 0.3 to 3 μm.

A "ratio of the mass of the composite oxide to the mass of vanadia" {(mass of composite oxide)/(mass of vanadia)} in the above-mentioned "composite particles (ii)" is preferably from 19 to 99. When the above-mentioned "ratio of the mass of the composite oxide to the mass of vanadia" is less than 19, the resulting catalyst body may be inferior in $NO_x$ purification performance because due to accelerated oxidation of $SO_2$ and an increased production amount of $SO_3$, ammonium sulfate, which is a reaction product with $NH_3$, clogs the pores of the catalyst therewith. When the above-mentioned "ratio of the mass of the composite oxide to the mass of vanadia" exceeds 99, on the other hand, the resulting catalyst body may be inferior in $NO_x$ removal performance. The above-mentioned "ratio of the mass of the composite oxide to the mass of vanadia" is more preferably from 21 to 66. In particular, it is most preferably from 24 to 49.

In addition, the effective GSA (geometrical surface area) of the honeycomb structure body 10 is preferably from 10 to 50 $cm^2/cm^3$. When the effective GSA (geometrical surface area) is less than 10 $cm^2/cm^3$, contact frequency between an exhaust gas and the catalyst decreases, leading to deterioration in removal performance by the catalyst. When the effective GSA (geometrical surface area) exceeds 50 $cm^2/cm^3$, on the other hand, an increase in pressure loss may occur. The effective GSA (geometrical surface area) of the honeycomb structure body 10 is more preferably from 15 to 45 $cm^2/cm^3$. In particular, it is most preferably from 20 to 40 $cm^2/cm^3$.

When the coat layer 15 is the coat layer (A), a "ratio of the mass of zeolite to a total of the mass of vanadia and the mass of titania in the coat layer (A)" {(mass of zeolite):(total of mass of vanadia and mass of titania)} contained in the honeycomb structure body 10 is preferably from 99:1 to 60:40. When the "ratio of the mass of zeolite to a total of the mass of vanadia and the mass of titania in the coat layer (A)" is from 99:1 to 60:40, the resulting catalyst body is excellent in NO purification performance. The "ratio of the mass of zeolite to a total of the mass of vanadia and the mass of titania in the coat layer (A)" is more preferably from 95:5 to 65:35. In particular, it is most preferably from 90:10 to 70:30.

When the coat layer 15 is the coat layer (B), on the other hand, a "ratio of the mass of zeolite to a total of the mass of vanadia, mass of titania, and mass of tungsten oxide in the coat layer (B)" {"(mass of zeolite):(total of mass of vanadia, mass of titania, and mass of tungsten oxide)"} contained in the honeycomb structure body 10 is preferably from 99:1 to 60:40. When the "ratio of the mass of zeolite to a total of the mass of vanadia, mass of titania, and mass of tungsten oxide in the coat layer (B)" is from 99:1 to 60:40, the resulting catalyst body is excellent in $NO_x$ purification performance. The "ratio of the mass of zeolite to a total of the mass of vanadia, mass of titania, and mass of tungsten oxide in the coat layer (B)" is more preferably from 95:5 to 65:35. In particular, it is most preferably from 90:10 to 70:30.

The thermal expansion coefficient, at from 40 to 800° C., of the honeycomb structure body 10 is preferably 1.0 ppm/K or less. When the thermal expansion coefficient, at from 40 to 800° C., of the honeycomb structure body 10 is 1.0 ppm/K or less, it is excellent in thermal shock resistance. The thermal expansion coefficient, at from 40 to 800° C., of the honeycomb structure body 10 is more preferably 0.8 ppm/K or less. In particular, it is most preferably 0.6 ppm/K or less.

The coat layer 15 contains an "inorganic binder that does not disappear at 500° C. or less" preferably in an amount of from 1 to 30 mass %. When the coat layer 15 contains from 1 to 30 mass % of the "inorganic binder that does not disappear at 500° C. or less", the resulting coat layer 15 has enhanced structural strength. When the coat layer 15 contains the "inorganic binder that does not disappear at 500° C. or less" in an amount less than 1 mass %, the resulting coat layer may be inferior in anti-peeling strength. When the coat layer 15 contains the "inorganic binder that does not disappear at 500° C. or less" in an amount exceeding 30 mass %, on the other hand, the resulting catalyst body may be inferior in $NO_x$ removal performance. The coat layer 15 contains the "inorganic binder that does not disappear at 500° C. or less" more preferably in an amount of from 3 to 25 mass %. In particular, it contains the "inorganic binder that does not disappear at 500° C. or less" most preferably in an amount of from 5 to 20 mass %.

The term "inorganic binder that does not disappear at 500° C. or less" as used herein means an inorganic binder having the property of not burning to disappear at 500° C.

Examples of the "inorganic binder that does not disappear at 500° C. or less" include alumina sol, montmorillonite, boehmite, γ alumina, and attapulgite.

"Other characteristics" of the honeycomb catalyst body 50 will next be described.

The porosity of the base layer 11 is preferably from 20 to 70%, more preferably from 40 to 60%. The base layer 11 having a porosity less than 20% may prevent an exhaust gas from entering the base layer 11, leading to a decrease in purification percentage. The base layer 11 having a porosity greater than 70%, on the other hand, may reduce the strength of the honeycomb structure body 10. The porosity of the base layer 11 is a value measured based on a mercury intrusion technique while using a mercury porosimeter.

An area of the cross-section of the honeycomb structure body 10 perpendicular to the direction z is preferably from 300 to 200000 $mm^2$. When the area of the cross-section of the honeycomb structure body 10 perpendicular to the direction z is smaller than 300 $mm^2$, the area of the partition walls 9 capable of treating an exhaust gas may decrease and in addition, a pressure loss may increase. When the area of the cross-section of the honeycomb structure body 10 perpendicular to the direction z is greater than 200000 $mm^2$, on the other hand, the honeycomb structure body 10 may have deteriorated strength.

Incidentally, the porosity of the base layer 11 is that of pores (micropores) formed between zeolite crystal particles and pores (mesopores) which an inorganic binder has but not that of pores (micropores) formed in zeolite crystals as their crystal structure. The pores (micropores) formed in zeolite crystals as their crystal structure differ, depending on the kind of zeolite. For example, ZSM-5 has pores of an oxygen 10-membered ring and its pore size is from about 5 to 6 Å, while β-zeolite has pores of an oxygen 12-membered ring and its pore size is from about 5 to 7.5 Å.

The thickness of the partition walls 9 is preferably from 50 μm to 1 mm, more preferably from 100 μm to 500 μm. When each of the partition walls 9 is thinner than 50 μm, the resulting honeycomb structure body 10 may have a lower strength. When each of the partition walls 9 is greater than 1 mm, on the other hand, the pressure loss may increase when an exhaust gas flows through the honeycomb structure body 10. The term "thickness of the partition walls 9" means the width of the partition walls 9 at the cross-section of the honeycomb catalyst body 50 perpendicular to the direction z.

Although the cell density of the honeycomb structure body 10 is not particularly limited, it is preferably from 7 to 235 cells/$cm^2$, more preferably from 31 to 186 cells/$cm^2$. When the cell density of the honeycomb structure body 10 is greater than 235 cells/$cm^2$, a pressure loss may become large when an exhaust gas flows through the honeycomb structure body 10. The cell densities of the honeycomb structure body 10 smaller than 7 cells/$cm^2$, on the other hand, may decrease an area capable of conducting exhaust gas purification treatment.

The shape of the cell 7 at the cross-section perpendicular to the direction z is not particularly limited and examples include triangle, square, hexagon, octagon, and round, and combinations thereof (for example, honeycomb structure body 10 having both a triangle cell 7 and a hexagonal cell 7 therein).

The overall shape of the honeycomb catalyst body 50 is not particularly limited and it can have a desired shape such as a circular cylindrical shape or a cylindrical shape with an oval bottom. With regards to the size of the honeycomb catalyst body 50, for example, in a circular cylindrical shape, the diameter of the bottom surface is preferably from 20 to 500 mm, more preferably from 70 to 300 mm; and the length of the honeycomb catalyst body 50 in the direction z is preferably from 10 to 500 mm, more preferably from 30 to 300 mm.

The honeycomb catalyst body 50 has, as illustrated in FIG. 1, preferably an outer peripheral wall 17 provided so as to surround therewith the outer periphery of the honeycomb structure body 10. Although the material of the outer peripheral wall 17 is not necessarily made of the same material as that of the base layer 11, it preferably contains mainly the same material as that of the base layer 11 or contains mainly a material having physical properties equivalent to those of the base layer 11. It is more preferred that the base layer 11 and the outer peripheral wall 17 contain the same material, because a large difference in the material between the base layer and the outer peripheral wall 17 from the standpoint of physical properties such as heat resistance and thermal expansion coefficient may sometimes cause a problem such as breakage of the base layer 11.

The outer peripheral wall 17 may be formed monolithically with the partition wall 9 by extrusion or may be, after extrusion, formed by processing the outer peripheral portion of the formed body into a desired shape and then coating the processed outer peripheral portion of the formed body.

The thickness of the outer peripheral wall 17 is preferably 10 mm or less. The thickness of the outer peripheral wall 17 exceeding 10 mm may sometimes decrease the area capable of conducting exhaust gas purification treatment.

2. Method of Manufacturing the Honeycomb Catalyst Body of the First Mode

One embodiment of the method of manufacturing the honeycomb catalyst body of the first mode will next be described. The method of manufacturing the honeycomb catalyst body according to this embodiment has a forming step, a firing step, and a coat layer forming step. In the forming step, a forming raw material containing zeolite powder ion-exchanged with a metal ion, an inorganic binder is extruded. Ion-exchange of zeolite with a metal ion may be conducted after firing. In such a manner, a honeycomb formed body equipped with partition walls (only base layers at this point) that define a plurality of cells extending from a first end face as one of the end faces to a second end face as the other end face, and serving as through channels of a fluid is obtained. In the firing step, the resulting honeycomb formed body is fired to form a honeycomb-shaped fired body (honeycomb fired body). In the coat layer forming step, a coat layer is formed on the surface of the partition walls (base layers) of the honeycomb fired body.

The method of manufacturing the honeycomb catalyst body of the present embodiment will next be described in further detail.

2-1. Forming Step

First, a honeycomb formed body equipped with partition walls that define a plurality of cells extending from a first end face to a second end face is formed by extruding a forming raw material containing zeolite powder ion-exchanged with a metal ion and an inorganic binder.

Zeolite powder can be ion-exchanged with a metal ion by using the following method. First, an ion exchange solution (metal ion-containing solution) containing a metal ion to be used for ion exchange is prepared. For example, for ion-exchange with a silver ion, an aqueous solution of silver nitrate or silver acetate is prepared. For ion-exchange with a copper ion, an aqueous solution of copper acetate, copper sulfate, or copper nitrate is prepared. For ion-exchange with an iron ion, an aqueous solution of iron sulfate or iron acetate is prepared. The concentration of the ion exchange solution is preferably from 0.05 to 0.5 (mol/liter). Zeolite powder is infiltrated with the ion exchange solution. The infiltration time can be determined as needed depending on the desired amount of a metal ion to be used for ion exchange. The resulting ion exchange solution is then filtered through a mesh made of a metal or a resin and capable of collecting the zeolite powder to separate the solution into zeolite powder and ion exchange water. The zeolite powder thus separated is dried and then calcined. It is preferred to obtain ion-exchanged zeolite powder in such a manner. Drying is conducted preferably under the following conditions: at from 80 to 150° C. for from 1 to 10 hours. Calcination is conducted preferably under the following conditions: at from 400 to 600° C. for from 1 to 10 hours.

The metal ion which the zeolite powder has is preferably at least one metal ion selected from the group consisting of an iron ion, a copper ion, and a silver ion. For the purpose of $NO_x$ purification, metal ions containing at least an iron ion and a copper ion are preferred, while for the purpose of adsorption of hydrocarbons, metal ions containing at least a silver ion and a copper ion are preferred. The metal ion to be used for ion exchange of the zeolite powder can be selected as needed, depending on the above-mentioned purpose.

The forming raw material is prepared by mixing the zeolite powder ion-exchanged with a metal ion (which may be called "ion-exchanged zeolite powder"), a forming aid, an inorganic binder, and the like.

Examples of the zeolite powder (zeolite powder before ion exchange) include ZSM-5 powder, β-zeolite powder, SAPO-34 powder, chabazite powder, and ferrierite powder. Of these, chabazite powder and β-zeolite powder are preferred because they have good purification performance and good adsorption performance. The average particle size of the zeolite powder is usually from 1 to 20 μm, more preferably from 3 to 15 μm. The average particle size of the zeolite powder smaller than 1 μm is not preferred, because it decreases the size of pores formed between zeolite particles and deteriorates the exhaust gas purification efficiency of the zeolite structural body thus obtained. The average particle size of the zeolite powder exceeding 20 μm, on the other hand, is not preferred, because it increases the size of pores formed between the zeolite particles and reduces the strength of the honeycomb catalyst body.

The average particle size of the zeolite power is measured using a laser diffraction method.

The average particle size of the inorganic binder is usually from 0.1 to 5 μm, preferably from 0.5 to 2 μm. An average particle size of the inorganic binder that is smaller than 0.1 μm is not preferred because it excessively increases the density of the inorganic binder that covers the zeolite particles therewith and deteriorates the purification performance. An average particle size of the inorganic binder that is greater than 5 μm, on the other hand, is not preferred because the inorganic binder with a large particle size hinders binding of zeolite particles and decreases the strength of the zeolite structural body. The average particle size of the inorganic binder is a value measured using a laser diffraction method.

A mass ratio of the ion-exchanged zeolite powder to the inorganic binder {(ion-exchanged zeolite powder):(inorganic binder)} in the forming raw material is preferably from 9.0:1.0 to 5.0:5.0, more preferably from 8.0:2.0 to 6.0:4.0. The mass ratio of the ion-exchanged zeolite powder greater than "9.0:1.0" is not preferred because if so, the volume of pores formed between zeolite particles becomes large, leading to deterioration in the strength of the honeycomb catalyst body thus obtained. The mass ratio of the ion exchanged zeolite powder smaller than "5.0:5.0" is, on the other hand, not preferred because it decreases the proportion of the $NO_x$ purification catalyst component in the honeycomb structure body and the honeycomb catalyst body thus obtained has a reduced exhaust gas purification efficiency.

Specific examples of the inorganic binder in the forming raw material include alumina sol, montmorillonite, boehmite, γ alumina, and attapulgite.

A water content in the forming raw material is preferably from 30 to 70 parts by mass with respect to 100 parts by mass of the ion-exchanged zeolite powder. The forming raw material having a water content within the above-mentioned range is excellent in formability and shape retention.

When single use of the inorganic binder is not enough for desired formability and shape retention, an organic binder or surfactant can be used. Specific examples of the organic binder include carboxymethyl cellulose, methyl cellulose, polyvinyl alcohol, and hydroxypropoxymethyl cellulose. Specific examples of the surfactant include polycarboxylic acid, sodium laurate, and potassium laurate.

The mixing method of the ion-exchanged zeolite powder, the inorganic binder and the like is not particularly limited and a known method can be employed. For example, a method using a mixer such as Lodige mixer is preferred.

Next, the forming raw material is kneaded into a columnar formed body. A method of kneading the forming raw material into a columnar formed body is not particularly limited and examples include methods using a kneader, a vacuum kneader, or the like.

Then, the columnar body is extruded into a honeycomb formed body. The honeycomb formed body is equipped with partition walls that define a plurality of cells extending from a first end face as one of the end faces to a second end face as the other end face, and serving as through channels of a fluid. In extrusion, a die having a desired overall shape, cell shape, partition wall thickness, cell density, and the like is preferably used. The material of the die is preferably a wear-resistant metal.

2-2. Firing Step

The honeycomb formed body thus obtained is then fired. Prior to firing the honeycomb formed body, drying is preferably conducted (drying step). A drying method is not particularly limited and examples include an electromagnetic wave heating system such as microwave heating drying and high-frequency induction heating drying and an external heating system such as hot air drying and superheated steam drying. Of these, it is preferred to dry to remove a predetermined amount of water by using the electromagnetic wave heating system and then dry to remove the remaining amount by the external heating system from the standpoint of rapidly and uniformly drying the whole honeycomb formed body without causing cracks.

In addition, prior to firing (main firing) of the honeycomb formed body, it is preferred to calcine the honeycomb formed body (calcination step). Calcination is conducted for degreasing and a calcination method is not particularly limited insofar it can remove organic matters (such as forming binder). As calcination conditions, it is preferred to heat the honeycomb formed body for from about 3 to 100 hours at a temperature of from about 200 to 1000° C. in an oxidizing atmosphere.

Next, the honeycomb formed body is fired to obtain a honeycomb fired body (firing step). A firing method is not particularly limited and the honeycomb formed body can be fired using an electric furnace, gas furnace, or the like. Firing is conducted preferably under the following conditions: at from 500 to 900° C. for from 1 to 10 hours in the atmosphere.

By firing, the inorganic binder (such as alumina sol or boehmite) in the forming raw material becomes a strength retention material between zeolite particles. In such a manner, a honeycomb fired body having partition walls (only a base layer at this time point) containing from 50 to 90 mass % of zeolite is obtained.

2-3. Coat Layer Forming Step

When the coat layer (A) is formed, the coat layer forming step may be, for example, a step as described below. First, "DT-51" (trade name) product of Cristal Global can be used as titania ($TiO_2$). To it, ammonium metavanadate, monoethanolamine, and γ-alumina as an inorganic binder are added so that the amount of vanadia after baking the catalyst will be from 2 to 3 mass % in terms of $V_2O_5$. Moreover, a dispersant and water are added to obtain a catalyst slurry. The resulting catalyst slurry may be loaded on the partition walls (base layers) of the honeycomb fired body. After drying, the coat layer can be formed by baking under the following conditions: at 500° C. for 2 hours.

When the coat layer (B) is formed, for example, the coat layer forming step may be the following step. First, "DT-52" (trade name), product of Cristal Global can be used as a composite oxide of titania ($TiO_2$) and tungsten oxide ($WO_3$). To it, ammonium metavanadate, monoethanolamine, and γ-alumina as an inorganic binder are added so that the amount of vanadia after baking the catalyst will be from 2 to 3 mass % in terms of $V_2O_5$. In addition, a dispersant and water are added to obtain a catalyst slurry. The resulting catalyst slurry may be loaded on the partition walls (base layers) of the honeycomb fired body. After drying, the coat layer can be formed by baking under the following conditions: at 500° C. for 2 hours.

3. Second Mode of Honeycomb Catalyst Body

Figure 4:
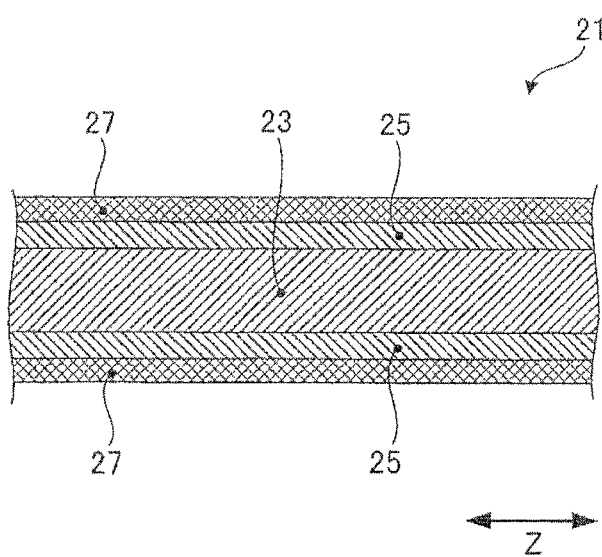
FIG. 4 is an enlarged schematic view of the cross-section of a partition wall of the honeycomb catalyst body of the another embodiment of the invention.

As illustrated in FIGS. 1 and 4, a honeycomb catalyst body 55 of the present embodiment (second mode) is equipped with a honeycomb structure body 35 having partition walls 21 that define a plurality of cells extending from a first end face 3 as one of the end faces to a second end face 5 as the other end face, and serving as through channels of a fluid. The partition walls 21 each have a support layer 23 composed mainly of ceramic, an intermediate layer 25 with which the surface of the support layer 23 is coated and that contains from 50 to 95 mass % of zeolite, and a coat layer 27 with which the surface of the intermediate layer 25 is coated. The coat layer 27 is the coat layer (A) containing from 1 to 5 mass % vanadia and titania or the coat layer (B) containing from 1 to 5 mass % vanadia and a composite oxide of titania and tungsten oxide. FIG. 1 is a schematic perspective view of the honeycomb catalyst body 55 of the other embodiment (second mode) viewed from the side of the first end face 3. FIG. 4 is an enlarged schematic view of the cross-section of the partition wall 21.

In the honeycomb catalyst body 55, since the zeolite-containing intermediate layer 25 is coated with the coat layer 27, sulfur or water does not easily come into contact with the zeolite contained in the intermediate layer 25, making it possible to suppress deterioration or breakage of the intermediate layer 25. Described specifically, the vanadia-containing coat layer 27 serves to suppress contact of the zeolite contained in the intermediate layer 25 with sulfur and deterioration caused thereby. The vanadia-containing coat layer 27 serves to suppress contact of the zeolite contained in the intermediate layer 25 with water and absorption and desorption of water caused thereby. As a result, expansion of zeolite due to absorption of water and shrinkage of zeolite due to desorption of water are suppressed, leading to suppression of the breakage of the intermediate layer 25.

The support layer 23 contains, as a main component thereof, preferably at least one selected from cordierite, silicon carbide, silicon-silicon carbide composite material, mullite, alumina, aluminum titanate, silicon nitride, and silicon carbide-cordierite composite material. Of these, the support layer 23 containing cordierite as a main component is more preferred. The honeycomb catalyst body 55 having a small thermal expansion coefficient and excellent thermal shock resistance can be obtained using cordierite as a material of the support layer 23. The term "main component" as used herein means that the content is 50 mass % or more based on the total mass. For example, the term "contains cordierite as a main component" means that the support layer 23 contains 50 mass % or more of cordierite. The term "silicon-silicon carbide composite material" means a composite material obtained using silicon carbide (SiC) as an aggregate and silicon (Si) as a binder.

The intermediate layer 25 of the honeycomb catalyst body 55 usually contains from 50 to 95 mass % of zeolite. When the amount of the zeolite contained in the intermediate layer 25 is less than 50 mass %, the resulting catalyst body may be inferior in catalyst performance provided by the zeolite. When the amount of the zeolite contained in the intermediate layer 25 exceeds 95 mass %, on the other hand, the intermediate layer 25 may have a lower strength. The zeolite contained in the intermediate layer 25 is preferably from 55 to 94 mass %, more preferably from 60 to 93 mass %. In particular, it is most preferably from 65 to 92 mass %.

The zeolite contained in the intermediate layer 25 is preferably zeolite ion-exchanged with a metal ion and therefore having the metal ion. The metal ion contained in the zeolite is preferably at least one selected from the group consisting of an iron ion, a copper ion, and a silver ion. When the catalyst is used for purifying $NO_x$, metal ions containing at least an iron ion and a copper ion are preferred. When the catalyst is used for adsorbing a hydrocarbon thereto, on the other hand, metal ions containing at least a silver ion and a copper ion are preferred.

Examples of the zeolite contained in the intermediate layer 25 include ZSM-5, β-zeolite, SAPO-34, chabazite, and ferrierite. Of these, β-zeolite is preferred because it has good purification performance and good adsorption performance.

The coat layer 27 of the honeycomb catalyst body 55 usually contains from 1 to 5 mass % of vanadia. When the amount of the vanadia contained in the coat layer 27 is less than 1 mass %, the resulting catalyst body may be inferior in $NO_x$ purification performance. When the amount of the vanadia contained in the coat layer 27 exceeds 5 mass %, on the other hand, the resulting catalyst body may be inferior in $NO_x$ purification performance because due to accelerated oxidation of $SO_2$ and an increased production amount of $SO_3$, ammonium sulfate, which is a reaction product with $NH_3$, clogs the pores of the catalyst. The amount of the vanadia contained in the coat layer 27 is preferably from 1 to 5 mass %, more preferably from 1.5 to 4.5 mass %. In particular, it is most preferably from 2 to 4 mass %.

The thickness of the coat layer 27 of the honeycomb catalyst body 55 is preferably from 1 to 50 µm. When the thickness of the coat layer 27 is less than 1 µm, the coat layer may be inferior in its effect of suppressing the contact of sulfur or water with the support layer 23. When the thickness of the coat layer 27 exceeds 50 µm, on the other hand, a pressure loss may increase. The thickness of the coat layer 27 is more preferably from 3 to 45 µm, still more preferably from 5 to 40 µm. In particular, it is most preferably from 7 to 35 µm. The term "thickness of the coat layer 27" means the width of the coat layer 27 at the cross-section of the honeycomb catalyst body 55 perpendicular to the direction z.

When the coat layer 27 is the above-mentioned "coat layer (A)", it contains "composite particles (i)" having titania particles and vanadia particles attached to the surface thereof (which will hereinafter be called "composite particles (i)" simply). Since the coat layer 27 contains the composite particles (i), the resulting catalyst body is excellent in $NO_x$ purification performance.

The average particle size of the titania particles contained in the above-mentioned "composite particles (i)" is preferably from 0.1 to 5 µm. When the average particle size of the titania particles contained in the "composite particles (i)" is less than 0.1 µm, the resulting catalyst body may be inferior in $NO_x$ removal performance due to a decrease in specific surface area caused by firing. When the average particle size of the titania particles contained in the "composite particles (i)" exceeds 5 µm, on the other hand, the resulting catalyst body may be inferior in $NO_x$ purification performance. The average particle size of the titania particles contained in the "composite particles (i)" is more preferably from 0.2 to 4 µm. In particular, it is most preferably from 0.3 to 3 µm.

A "ratio of the mass of titania to the mass of vanadia" {(mass of titania)/(mass of vanadia)} in the above-mentioned "composite particles (i)" is preferably from 19 to 99. When the above-mentioned "ratio of the mass of titania to the mass of vanadia" is less than 19, the resulting catalyst body may be inferior in $NO_x$ purification performance because due to accelerated oxidation of $SO_2$ and an increased production amount of $SO_3$, ammonium sulfate, which is a reaction product with $NH_3$, clogs the pores of the catalyst. When the above-mentioned "ratio of the mass of titania to the mass of vanadia" exceeds 99, on the other hand, the resulting catalyst body may be inferior in $NO_x$ purification performance. Moreover, the above-mentioned "ratio of the mass of titania to the mass of vanadia" is more preferably from 21 to 66. In particular, it is most preferably from 24 to 49.

When the coat layer 27 is the above-mentioned "coat layer (B)", it contains "composite particles (ii)" having "composite oxide particles" containing a composite oxide of titania and tungsten oxide (which will hereinafter be called "composite oxide particles", simply) and vanadia particles attached to the surface of the composite oxide particles (which will hereinafter be called "composite particles (ii), simply). Since the coat layer 27 contains the composite particles (ii), the resulting catalyst body is excellent in $NO_x$ purification performance.

The average particle size of the above-mentioned "composite oxide particles" is preferably from 0.1 to 5 When the average particle size of the "composite oxide particles" is less than 0.1 µm, the resulting catalyst body may be inferior in $NO_x$ purification performance due to a decrease in specific surface area caused by firing. When the average particle size of the "composite oxide particles" exceeds 5 µm, on the other hand, the resulting catalyst body may be inferior in $NO_x$ purification performance. The average particle size of the "composite oxide particles" is more preferably from 0.2 to 4 µm. In particular, it is most preferably from 0.3 to 3 µm.

A "ratio of the mass of the composite oxide to the mass of vanadia" {(mass of composite oxide)/(mass of vanadia)} in the above-mentioned "composite particles (ii)" is preferably from 19 to 99. When the above-mentioned "ratio of the mass of the composite oxide to the mass of vanadia" is less than 19, the resulting catalyst body may be inferior in $NO_x$ purification performance because due to accelerated oxidation of $SO_2$ and an increased production amount of $SO_3$, ammonium sulfate, which is a reaction product with $NH_3$, clogs the pores of the catalyst. When the above-mentioned "ratio of the mass of the composite oxide to the mass of vanadia" exceeds 99, on the other hand, the resulting catalyst body may be inferior in $NO_x$ purification performance. The above-mentioned "ratio of the mass of the composite oxide to the mass of vanadia" is more preferably from 21 to 66. In particular, it is most preferably from 24 to 49.

The effective GSA (geometrical surface area) of the honeycomb structure body 35 is preferably from 10 to 50 $cm^2/cm^3$. When the effective GSA (geometrical surface area) is less than 10 $cm^2/cm^3$, the purification performance of the catalyst may be inferior due to a reduction in contact frequency between an exhaust gas and the catalyst. When the effective GSA (geometrical surface area) exceeds 50 $cm^2/cm^3$, on the other hand, an increase in pressure loss may occur. The effective GSA (geometrical surface area) of the honeycomb structure body 35 is more preferably from 15 to 45 $cm^2/cm^3$. In particular, it is most preferably from 20 to 40 $cm^2/cm^3$.

When the coat layer 27 is the coat layer (A), a "ratio of the mass of zeolite to a total of the mass of vanadia and the mass of titania in the coat layer (A)" {(mass of zeolite):(total of mass of vanadia and mass of titania)} contained in the honeycomb structure body 35 is preferably from 99:1 to 60:40. When the "ratio of the mass of zeolite to a total of the mass of vanadia and the mass of titania in the coat layer (A)" is from 99:1 to 60:40, the resulting catalyst body is excellent in NO purification performance. Moreover, the "ratio of the mass of zeolite to a total of the mass of vanadia and the mass of titania in the coat layer (A)" is more preferably from 95:5 to 65:35. In particular, it is most preferably from 90:10 to 70:30.

When the coat layer 27 is the coat layer (B), on the other hand, a "ratio of the mass of zeolite to a total of the mass of vanadia, mass of titania, and mass of tungsten oxide in the coat layer (B)" {"(mass of zeolite):(total of mass of vanadia, mass of titania, and mass of tungsten oxide)"} contained in the honeycomb structure body 35 is preferably from 99:1 to 60:40. When the "ratio of the mass of zeolite to a total of the mass of vanadia, mass of titania, and mass of tungsten oxide in the coat layer (B)" is from 99:1 to 60:40, the resulting catalyst body is excellent in $NO_x$ purification performance. The "ratio of the mass of zeolite to a total of the mass of vanadia, mass of titania, and mass of tungsten oxide in the coat layer (B)" is more preferably from 95:5 to 65:35. In particular, it is most preferably from 90:10 to 70:30.

The thermal expansion coefficient, at from 40 to 800° C., of the honeycomb structure body 35 is preferably 1.0 ppm/K or less. When the thermal expansion coefficient, at from 40 to 800° C., of the honeycomb structure body 35 is 1.0 ppm/K or less, it is excellent in thermal shock resistance. The thermal expansion coefficient, at from 40 to 800° C., of the honeycomb structure body 35 is more preferably 0.8 ppm/K or less. In particular, it is most preferably 0.6 ppm/K or less.

The coat layer 27 contains an "inorganic binder that does not disappear at 500° C. or less" preferably in an amount of from 1 to 30 mass %. When the coat layer 27 contains from 1 to 30 mass % of the "inorganic binder that does not disappear at 500° C. or less", the resulting coat layer 27 has enhanced structural strength. When the coat layer 27 contains the "inorganic binder that does not disappear at 500° C. or less" in an amount less than 1 mass %, the resulting coat layer may be inferior in anti-peeling strength. When the coat layer 27 contains the "inorganic binder that does not disappear at 500° C. or less" in an amount exceeding 30 mass %, on the other hand, the resulting catalyst body may be inferior in $NO_x$ purification performance. The coat layer 27 contains the "inorganic binder that does not disappear at 500° C. or less" more preferably in an amount of from 3 to 25 mass %. In particular, it contains the "inorganic binder that does not disappear at 500° C. or less" most preferably in an amount of from 5 to 20 mass %.

Examples of the "inorganic binder that does not disappear at 500° C. or less" include alumina sol, montmorillonite, boehmite, γ-alumina, and attapulgite.

"Other characteristics" of the honeycomb catalyst body 55 will next be described.

The thickness of the support layer 23 is preferably from 0.060 to 0.288 mm, more preferably from 0.108 to 0.240 mm, particularly preferably from 0.132 to 0.192 mm. An increase in pressure loss can be prevented by adjusting the thickness of the support layer 23 to fall within the above-mentioned range. The thickness of the support layer 23 is a value measured by microscopically observing the cross-section of the honeycomb catalyst body 55 perpendicular to the direction z (cross-section of the partition wall 21 perpendicular to the direction z).

The porosity of the support layer 23 is preferably from 40 to 70%, more preferably from 45 to 65%, particularly preferably from 50 to 60%. When the support layer 23 has a porosity within the above-mentioned range, an increase in pressure loss can be prevented while keeping adequate strength of the honeycomb catalyst body 55. The porosity of the support layer 23 is a value measured using a mercury porosimeter.

The cell density of the honeycomb structure body 35 is preferably from 7 to 235 cells/cm², more preferably from 31 to 186 cells/cm². When the cell density of the honeycomb structure body 35 is greater than 235 cells/cm², a pressure loss at the time when a gas flows through the honeycomb structure body 35 may become large. The cell densities of the honeycomb structure body 35 smaller than 7 cells/cm², on the other hand, may decrease an area capable of conducting exhaust gas purification treatment.

The shape of the cell 7 at the cross-section perpendicular to the direction z is not particularly limited and examples include triangle, square, hexagon, octagon, and round, and combinations thereof (for example, honeycomb structure body 35 having both a triangular cell 7 and a hexagonal cell 7 therein).

The overall shape of the honeycomb catalyst body 55 is not particularly limited and it can have a desired shape such as a circular cylindrical shape or a cylindrical shape with an oval bottom. With regards to the size of the honeycomb catalyst body 55, for example, in a circular cylindrical shape, the diameter of the bottom surface is preferably from 20 to 500 mm, more preferably from 70 to 300 mm; and the length of the honeycomb catalyst body 55 in the direction z is preferably from 10 to 500 mm, more preferably from 30 to 300 mm.

The honeycomb catalyst body 55 has preferably, as illustrated in FIG. 1, an outer peripheral wall 17 provided so as to surround therewith the outer periphery of the honeycomb structure body 35. Although the material of the outer peripheral wall 17 is not necessarily made of the same material as that of the support layer 23, it contains preferably mainly the same material as that of the support layer 23 or contains mainly a material having physical properties equivalent to those of the support layer 23. It is more preferred that the support layer 23 and the outer peripheral wall 17 contain the same material, because a large difference in the material between the support layer 23 and the outer peripheral wall 17 from the standpoint of physical properties such as heat resistance and thermal expansion coefficient may sometimes cause a problem such as breakage of the support layer 23.

The outer peripheral wall 17 may be formed monolithically with the support layer 23 by extrusion or may be, after extrusion, formed by processing the outer peripheral portion of the formed body into a desired shape and then coating the processed outer peripheral portion of the formed body.

The thickness of the outer peripheral wall 17 is preferably 10 mm or less. The thickness of the outer peripheral wall 17 exceeding 10 mm may sometimes decrease the area capable of conducting exhaust gas purification treatment.

4. Method of Manufacturing Honeycomb Catalyst Body of Second Mode

Next, one embodiment of a method of manufacturing a honeycomb catalyst body of a second mode will be described. The method of manufacturing a honeycomb catalyst body according to the present embodiment has a step of preparing a kneaded material, a forming step, a firing step, an intermediate layer forming step, and a coat layer forming step. In the step of preparing a kneaded material, a kneaded material is obtained by kneading a forming raw material containing a ceramic raw material and a pore forming material. In the forming step, the kneaded material is extruded into a honeycomb formed body having a plurality of cells formed therein. In the firing step, the honeycomb formed body is fired to have a honeycomb-shaped fired body (honeycomb fired body) equipped with partition walls. In the intermediate layer forming step, a zeolite-containing intermediate layer is formed on the surface of the partition wall (only support layer) of the honeycomb fired body. In the coat layer forming step, a coat layer is formed on the surface of the intermediate layer.

The method of manufacturing a honeycomb catalyst body of the present embodiment will next be described in further detail.

4-1. Step of Preparing a Kneaded Material

In the step of preparing a kneaded material, a kneaded material is obtained by mixing and kneading a forming raw material containing a ceramic raw material and a pore forming material.

As the ceramic raw material to be contained in the forming raw material, at least one raw material selected from the group consisting of cordierite-forming raw materials, cordierite, silicon carbide, silicon-silicon carbide composite materials, mullite, alumina, aluminum titanate, silicon nitride, and silicon carbide-cordierite composite materials is preferable. The cordierite forming material is a ceramic raw material mixed to have a chemical composition in which silica falls within a range of from 42 to 56 mass %, alumina falls within a range of from 30 to 45 mass %, and magnesia falls within a range of from 12 to 16 mass % and becomes cordierite by firing.

As the pore forming material, water absorbing polymers, unexpanded resin balloons, and starches can be used preferably.

The pore forming material is added in an amount of preferably from 1.0 to 8.0 parts by mass, more preferably from 1.0 to 6.0 parts by mass, particularly preferably from 1.0 to 4.0 parts by mass, each with respect to 100 parts by mass of a main raw material system (ceramic raw material contained in the forming raw material). When the amount of the pore forming material is less than 1.0 part by mass, the amount of the catalyst loaded on the honeycomb structural body thus obtained may decrease because of a decrease in the percentage of air pores (pores with a large diameter) formed in the partition walls. When the amount of the pore forming material exceeds 8.0 parts by mass, on the other hand, the honeycomb structural body thus obtained may have deteriorated strength due to excessive increase in the percentage of air pores.

The forming raw material is preferably prepared by mixing a dispersion medium, an organic binder, an inorganic binder, a surfactant, and the like further in the above-mentioned ceramic raw material and the pore forming material. The composition ratio of each raw material is not particularly limited and it is preferably set, depending on the structure of the honeycomb structure body to be formed, the material of the support layer, and the like.

As the dispersion medium, water can be used. The dispersion medium is added in an amount of preferably from 30 to 150 parts by mass with respect to 100 parts by mass of the ceramic raw material. When the amount of the dispersion medium falls within the above-mentioned range, the resulting raw material is excellent in formability and shape retention.

As the organic binder, methyl cellulose, hydroxypropylmethyl cellulose, hydroxypropylethyl cellulose, hydroxyethyl cellulose, carboxymethyl cellulose, and polyvinyl alcohol, and combinations thereof are preferred. The organic binder is added in an amount of preferably from 1 to 10 parts by mass with respect to 100 parts by mass of the ceramic raw material. When the amount of the organic binder falls within the above-mentioned range, the resulting forming raw material is excellent in formability and shape retention.

As the surfactant, ethylene glycol, dextrin, fatty acid soap, polyalcohol, and the like can be used. They may be used either singly or in combination. The surfactant is added in an amount of preferably from 0.1 to 5.0 parts by mass with respect to 100 parts by mass of the ceramic raw material. When the amount of the surfactant falls within the above-mentioned range, the resulting forming raw material is excellent in formability.

The method of kneading the forming raw material into a kneaded material is not particularly limited and examples include a method using, for example, a kneader or a vacuum kneader.

4-2. Forming Step

Next, the kneaded material thus obtained is formed into a honeycomb shape to obtain a honeycomb formed body (forming step). The method of forming a honeycomb formed body by forming the kneaded material is not particularly limited and a known forming method such as extrusion or injection molding may be employed. Suitable examples include a method of forming a honeycomb formed body by extrusion using a die having a desired cell shape, partition wall thickness, and cell density. As the material of the die, a wear-resistant metal is preferred.

The shape of the honeycomb formed body is not particularly limited and a circular cylindrical shape, a cylindrical shape having oval end faces, a cylindrical shape having polygonal end faces such as "square, rectangular, triangular, pentagonal, hexagonal, and octagonal" end face, and the like are preferred.

4-3. Firing Step

Next, the honeycomb formed body thus obtained is dried and fired to obtain a honeycomb fired body equipped with porous partition walls (only base layer at this time point) that define a plurality of cells serving as through channels of a fluid (firing step).

Although the drying method is not particularly limited, examples include hot air drying, microwave drying, dielectric drying, reduced pressure drying, vacuum drying, and freeze drying. Of these, it is preferred to use dielectric drying, microwave drying, and hot air drying either singly or in combination.

The honeycomb formed body is preferably calcined before firing (main firing) the honeycomb formed body. The calcination is performed for degreasing, and its method is not particularly limited insofar as at least a portion of organic matters (organic binder, surfactant, pore forming material, and the like) can be removed from the honeycomb formed body. The firing temperatures of an organic binder and a pore forming material are generally from about 100 to 300° C. and from about 200 to 800° C., respectively, so that heating at from about 200 to 1000° C. for from about 10 to 100 hours in an oxidizing atmosphere is preferred as calcination conditions.

The firing (main firing) of the honeycomb formed body is conducted so as to secure predetermined strength by sintering and thereby densifying the forming raw material constituting the calcined formed body. Since the firing conditions (temperature, time, and atmosphere) differ depending on the kind of the forming raw material, appropriate conditions may be selected according to its kind. For example, when a cordierite-forming raw material is used, the firing temperature is preferably from 1350 to 1440° C. The firing time is preferably from 3 to 10 hours as the highest temperature keeping time. Although an apparatus used for calcination and main firing is not particularly limited, an electric furnace, a gas furnace, or the like can be used.

4-4. Intermediate Layer Forming Step

In the intermediate layer forming step, a zeolite-containing intermediate layer is formed on the surface of the partition wall (only the base layer) of the honeycomb fired body.

A conventional method of loading a zeolite-containing catalyst on the partition wall of a honeycomb catalyst carrier can be applied to the intermediate layer forming step. For example, the following method can be employed. First, a catalyst containing a zeolite-containing catalyst is prepared. Then, the catalyst slurry thus prepared is allowed to enter the cell of the honeycomb fired body by dipping or suction. This catalyst slurry is preferably applied to the whole surface of the partition wall (at this time, only the support layer) in the cell. After the catalyst slurry is allowed to enter the cell, an extra slurry is blown off by using compressed air. Then, the catalyst slurry is dried and baked. The baking can be conducted under the following conditions: at from 450 to 700° C. for from 0.5 to 6 hours. In such a manner, the zeolite-containing intermediate layer can be formed on the surface of the support layer of the honeycomb fired body.

4-5. Coat Layer Forming Step

For the formation of the coat layer (A), a coat layer forming step may be, for example, a step as described below. First, "DT-51" (trade name) which is a product of Cristal Global can be used as titania ($TiO_2$). It is recommended to add ammonium metavanadate, monoethanolamine, and γ-alumina as an inorganic binder to it so that the amount of vanadia after baking the catalyst will be from 2 to 3 mass % in terms of $V_2O_5$, add a dispersant and water further to obtain a catalyst slurry, and then load the resulting catalyst slurry on the partition wall (a two layer structure comprised of the support layer and the intermediate layer) of the honeycomb fired body. After drying, baking is conducted under the conditions of 500° C. and 2 hours to form a coat layer.

For the formation of the coat layer (B), for example, the coat layer forming step may be, for example, a step as described below. First, "DT-52" (trade name), which is a product of Cristal Global, can be used as a composite oxide of titania ($TiO_2$) and tungsten oxide ($WO_3$). It is recommended to add ammonium metavanadate, monoethanolamine, and γ-alumina as an inorganic binder to it so that the amount of vanadia after baking the catalyst will be from 2 to 3 mass % in terms of $V_2O_5$, add a dispersant and water further to obtain a catalyst slurry, and load the resulting catalyst slurry on the partition wall (a two layer structure of the support layer and the intermediate layer) of the honeycomb fired body. After drying, baking is conducted under the conditions of 500° C. and 2 hours to form a coat layer.

EXAMPLES

The present invention will hereinafter be described in further detail by Examples, but the invention is not limited to or by these Examples.

Example 1

A forming raw material was prepared by mixing SAPO-34 ion-exchanged with a copper ion as zeolite honeycomb main raw materials, boehmite and montmorillonite which were inorganic binders, and an organic binder, and water in accordance with the composition of "Batch No. 1" shown in Table 1. Then, the forming raw material thus obtained was kneaded in a vacuum kneader into a columnar forming raw material. The resulting columnar forming raw material was extruded into a honeycomb formed body.

Next, the resulting honeycomb formed body was dried, followed by degreasing and then firing to obtain a honeycomb-shaped honeycomb fired body. The drying was conducted at 40° C. for 8 hours and then, at 120° C. for 48 hours. The degreasing was conducted at 450° C. for 5 hours. The firing was conducted at 650° C. for 5 hours. The honeycomb fired body thus obtained was a circular cylindrical shape having a bottom face with a diameter of 25.4 mm and a length of 50.8 mm in the direction of the central axis. In addition, the thickness ("rib thickness" in Table 2, the thickness of the base layer) of the partition wall (at this time, only the base layer), cell pitch, effective GSA (geometrical surface area) of the honeycomb fired body are shown in Table 2.

As a composite oxide of titania ($TiO_2$) and tungsten oxide ($WO_3$), "DT-52" (trade name), product of Cristal Global, was used. To it were added ammonium metavanadate, monoethanolamine, and γ-alumina as an inorganic binder so that the amount of vanadia after baking the catalyst became from 2 to 3 mass % in terms of $V_2O_5$. In addition, a dispersant and water were added to obtain a catalyst slurry. The resulting catalyst slurry was loaded on the partition wall (base layer) of the honeycomb fired body. After drying, a coat layer was formed on the surface of the base layer by baking under the conditions of 500° C. and 2 hours to obtain a honeycomb catalyst body (first mode). Incidentally, Table 2 shows "loaded amount (g/L) of composite oxide of titania and tungsten oxide, and vanadia (g/L) (a total amount of the loaded amount of the composite oxide of titania and tungsten oxide and the loaded amount of vanadia), "amount of inorganic binder" [(g/L), (mass %)]", and "thickness of coat layer" ("coat thickness" in Table 2).

Examples 2 to 27

In a manner similar to that of Example 1 except that each of the conditions was changed to that as shown in Table 2, honeycomb catalyst bodies of Examples 2 to 27 were obtained.

Comparative Example 1

In a manner similar to that of Example 1 except that the coat layer forming step was not conducted and each of the conditions was changed to that as shown in Table 2, a honeycomb catalyst body of Comparative Example 1 was obtained.

Comparative Examples 2 to 4

In a manner similar to that of Example 1 except that each of the conditions was changed to that as shown in Table 2, honeycomb catalyst bodies of Comparative Examples 2 to 4 were obtained. The term "peeling" in the column of "coat thickness" in Comparative Example 4 means that after formation of the coat layer, peeling of the coat layer occurred during handling until the $NO_x$ purification performance was evaluated. The "peeling" was presumed to occur because of excessively weak structural strength of the coat layer.

Example 28

As cordierite-forming raw materials, alumina, aluminum hydroxide, kaolin, talc, and silica were used in accordance with the composition of "Batch No. 2" shown in Table 1. To 100 parts by mass of the cordierite-forming raw materials were added 3.0 parts by mass of a water absorbing polymer having an average particle size of 125 μm as a pore forming material, 70.0 parts by mass of water as a dispersion medium, 5.6 parts by mass of an organic binder, and 0.5 part by mass of a surfactant, followed by mixing and kneading to prepare a kneading material. Methyl cellulose was used as the organic binder. Potassium laurate soap was used as the surfactant.

Next, the kneaded material was extruded using a predetermined die to obtain a honeycomb formed body having square cells (cells with a square shape at the cross-section perpendicular to the cell extending direction) and having a columnar (cylindrical) shape as an overall shape. The resulting honeycomb formed body was then dried using a microwave dryer, followed by complete drying using a hot air dryer. The honeycomb formed body thus dried was cut at both end faces thereof into a predetermined size.

The honeycomb formed body thus obtained was then fired at from 1410 to 1440° C. for 5 hours. In such a manner, a honeycomb fired body was obtained.

Next, water was added to SAPO-34 ion-exchanged with a copper ion as a zeolite catalyst, having an average particle size of 5 μm. The resulting mixture was wet ground in a ball mill to obtain crushed particles. To the resulting crushed particles was added γ-alumina as a binder so that content of γ-alumina is 10 mass %. In such a manner, an $NO_x$ reduction catalyst slurry was obtained. The honeycomb fired body was infiltrated with the $NO_x$ reduction catalyst slurry. The resulting honeycomb fired body was then dried at 120° C. for 20 minutes, followed by firing at 600° C. for one hour.

As a composite oxide of titania ($TiO_2$) and tungsten oxide ($WO_3$), "DT-52" (trade name), product of Cristal Global was used. To it were added ammonium metavanadate, monoethanolamine, and γ-alumina as an inorganic binder so that the amount of vanadia after baking the catalyst became from 2 to 3 mass % in terms of $V_2O_5$. In addition, a dispersant and water were added to obtain a catalyst slurry. The resulting catalyst slurry was loaded on the partition wall (partition wall made of the support layer and the intermediate layer) of the honeycomb fired body. After drying, a coat layer was formed on the surface of the intermediate layer by baking under the conditions of 500° C. and 2 hours to obtain a honeycomb catalyst body (second mode). Incidentally, Table 2 shows "loaded amount (g/L) of composite oxide of titania and tungsten oxide, and vanadia (g/L) (a total amount of the loaded amount of the composite oxide of titania and tungsten oxide and the loaded amount of vanadia), "amount of inorganic binder [(g/L), (mass %)]", and "thickness of coat layer" ("coat thickness" in Table 2).

Example 29

In a manner similar to that of Example 28 except that each of the conditions was changed to that of Table 2, a honeycomb catalyst body of Example 29 was obtained.

TABLE 1

| Batch No. | Zeolite honeycomb main raw material | | | Cordierite-forming raw material | | | | | Water absorbing polymer | | Binder (parts by mass) | Surfactant (parts by mass) | Water (parts by mass) |
|---|---|---|---|---|---|---|---|---|---|---|---|---|---|
| | Zeolite (parts by mass) | Boehmite (parts by mass) | Montmo-rillonite (parts by mass) | Talc (parts by mass) | Kaolin (parts by mass) | Calcined kaolin (parts by mass) | Alumina (parts by mass) | Aluminum hydroxide (parts by mass) | Average particle size (μm) | (parts by mass) | | | |
| 1 | 70 | 28 | 2 | — | — | — | — | — | — | — | 12.0 | — | 56.0 |
| 2 | — | — | — | 40 | 15 | 28 | 12 | 5 | 125 | 3.0 | 5.6 | 0.5 | 70.0 |

TABLE 2

| | Batch No. | Rib thickness (mm) | Cell pitch (mm) | Geometrical surface area (cm²/cm³) | Zeolite catalyst amount (g/L) | Titania (including tungsten oxide) vanadia catalyst | | | | Zeolite ratio (—) | percent NOx removal (%) | | Pressure loss (kPa) |
|---|---|---|---|---|---|---|---|---|---|---|---|---|---|
| | | | | | | Loaded amount (g/L) | Inorganic binder (g/L) | Inorganic binder (mass %) | Coat thickness (μm) | | Immediately after | after 10 hrs | |
| Example 1 | 1 | 0.50 | 2.54 | 13 | 306 | 10 | 1 | 10 | 5 | 97.1 | 50.7 | 50.1 | 0.7 |
| Example 2 | 1 | 0.29 | 1.47 | 22 | 306 | 10 | 1 | 10 | 3 | 97.1 | 68.6 | 67.3 | 1.1 |
| Example 3 | 1 | 0.20 | 1.04 | 31 | 299 | 10 | 1 | 10 | 2 | 97.1 | 85.4 | 83.0 | 2.2 |
| Example 4 | 1 | 0.17 | 0.85 | 38 | 310 | 10 | 1 | 10 | 1 | 97.2 | 93.2 | 90.4 | 3.9 |
| Example 5 | 1 | 0.50 | 2.54 | 13 | 306 | 20 | 2 | 10 | 10 | 94.4 | 51.4 | 51.3 | 0.8 |
| Example 6 | 1 | 0.29 | 1.47 | 22 | 306 | 20 | 2 | 10 | 6 | 94.4 | 69.2 | 69.0 | 1.1 |
| Example 7 | 1 | 0.20 | 1.04 | 31 | 299 | 20 | 2 | 10 | 4 | 94.3 | 85.7 | 85.1 | 2.2 |
| Example 8 | 1 | 0.17 | 0.85 | 38 | 310 | 20 | 2 | 10 | 3 | 94.5 | 93.4 | 92.0 | 4.0 |
| Example 9 | 1 | 0.14 | 0.73 | 44 | 299 | 20 | 2 | 10 | 3 | 94.3 | 96.2 | 94.1 | 4.5 |
| Example 10 | 1 | 0.13 | 0.66 | 49 | 306 | 20 | 2 | 10 | 2 | 94.4 | 97.2 | 95.2 | 5.0 |
| Example 11 | 1 | 0.50 | 2.54 | 13 | 306 | 50 | 5 | 10 | 26 | 87.2 | 53.2 | 52.9 | 1.0 |
| Example 12 | 1 | 0.29 | 1.47 | 22 | 306 | 50 | 5 | 10 | 15 | 87.2 | 70.8 | 70.7 | 1.2 |
| Example 13 | 1 | 0.20 | 1.04 | 31 | 299 | 50 | 5 | 10 | 11 | 86.9 | 86.7 | 86.4 | 2.3 |
| Example 14 | 1 | 0.17 | 0.85 | 38 | 310 | 50 | 5 | 10 | 9 | 87.3 | 93.8 | 93.4 | 4.0 |
| Example 15 | 1 | 0.14 | 0.73 | 44 | 299 | 50 | 5 | 10 | 7 | 86.9 | 96.5 | 96.0 | 4.9 |
| Example 16 | 1 | 0.13 | 0.66 | 49 | 306 | 50 | 5 | 10 | 6 | 87.2 | 97.4 | 96.8 | 5.2 |
| Example 17 | 1 | 0.50 | 2.54 | 13 | 306 | 100 | 10 | 10 | 26 | 77.2 | 55.7 | 55.4 | 1.0 |

TABLE 2-continued

| | Batch No. | Rib thickness (mm) | Cell pitch (mm) | Geometrical surface area (cm²/cm³) | Zeolite catalyst amount (g/L) | Titania (including tungsten oxide) vanadia catalyst | | | Coat thickness (μm) | Zeolite ratio (—) | percent NOx removal (%) | | Pressure loss (kPa) |
|---|---|---|---|---|---|---|---|---|---|---|---|---|---|
| | | | | | | Loaded amount (g/L) | Inorganic binder (g/L) | Inorganic binder (mass %) | | | Immediately after | after 10 hrs | |
| Example 18 | 1 | 0.29 | 1.47 | 22 | 306 | 100 | 10 | 10 | 15 | 77.3 | 72.9 | 72.3 | 1.2 |
| Example 19 | 1 | 0.20 | 1.04 | 31 | 299 | 100 | 10 | 10 | 11 | 76.9 | 87.9 | 87.6 | 2.3 |
| Example 20 | 1 | 0.17 | 0.85 | 38 | 310 | 100 | 10 | 10 | 9 | 77.5 | 94.5 | 93.9 | 4.0 |
| Example 21 | 1 | 0.14 | 0.73 | 44 | 299 | 100 | 10 | 10 | 7 | 76.8 | 96.9 | 96.0 | 4.9 |
| Example 22 | 1 | 0.13 | 0.66 | 49 | 306 | 100 | 10 | 10 | 6 | 77.3 | 97.7 | 95.9 | 5.3 |
| Example 23 | 1 | 0.20 | 1.04 | 31 | 299 | 200 | 20 | 10 | 44 | 62.4 | 89.8 | 89.8 | 2.6 |
| Example 24 | 1 | 0.17 | 0.85 | 38 | 310 | 200 | 20 | 10 | 36 | 63.3 | 95.4 | 95.3 | 4.3 |
| Example 25 | 1 | 0.14 | 0.73 | 44 | 299 | 200 | 20 | 10 | 31 | 62.4 | 97.4 | 97.0 | 5.4 |
| Example 26 | 1 | 0.13 | 0.66 | 49 | 306 | 200 | 20 | 10 | 28 | 62.9 | 98.1 | 97.8 | 5.5 |
| Example 27 | 1 | 0.17 | 0.85 | 38 | 310 | 50 | 12.5 | 25 | 9 | 89.2 | 93.7 | 93.0 | 4.1 |
| Example 28 | 2 | 0.10 | 1.27 | 29 | 200 | 50 | 5 | 10 | 12 | 81.6 | 80.3 | 79.9 | 1.2 |
| Example 29 | 2 | 0.10 | 1.27 | 29 | 200 | 100 | 10 | 10 | 25 | 69.0 | 82.5 | 82.4 | 1.3 |
| Comp. Ex. 1 | 1 | 0.17 | 0.85 | 38 | 310 | 0 | — | — | — | 100.0 | 93.0 | 37.6 | 3.9 |
| Comp. Ex. 2 | 1 | 0.17 | 0.85 | 38 | 310 | 5 | 0.5 | 10 | <1 | 98.6 | 93.1 | 46.8 | 3.9 |
| Comp. Ex. 3 | 1 | 0.17 | 0.85 | 38 | 310 | 300 | 30 | 10 | 54 | 53.4 | 96.0 | 96.0 | 5.9 |
| Comp. Ex. 4 | 1 | 0.17 | 0.85 | 38 | 310 | 50 | 0 | 0 | Peeling | 86.1 | — | — | — |

With regards to the honeycomb catalyst bodies obtained in Examples 1 to 29 and Comparative Examples 1 to 3, "zeolite ratio", "percent $NO_x$ purification", and "pressure loss" were evaluated (the results are shown in Table 2). The evaluation method of each of the evaluation items will next be described.

[Zeolite Ratio]

A zeolite ratio was determined from the "amount of zeolite (g/L)" used for the base layer (Examples 1 to 27 and Comparative Examples 1 to 3) or the intermediate layer (Examples 28 and 29) and the "amount (g/L) of composite oxide of titania and tungsten oxide, and vanadia" obtained by subtracting the amount (g/L) of the inorganic binder from the total amount (g/L) of the composite oxide of titania and tungsten oxide and vanadia based on the following formula:

Zeolite ratio=(amount of zeolite)/(total amount of composite oxide of titania and tungsten oxide, and amount vanadia)×100

[Purification Performance]

A columnar test specimen having a diameter of 25.4 mm and a length of 50.8 mm was obtained as the honeycomb catalyst body and an $NO_x$-containing test gas was allowed to flow through the test specimen. Then, the $NO_x$ amount of a gas exhausted from the honeycomb catalyst body was analyzed using a gas analyzer.

First, the temperature of the test gas to be flowed through the test specimen was set at 250° C. The test specimen and the test gas were set to permit control of the temperature of them by a heater. An infrared image furnace was used as the heater. More specifically, the test gas used was a mixture of nitrogen with 10 vol % of carbon dioxide, 10 vol % of oxygen, 100 ppm of nitrogen monoxide, 100 ppm of nitrogen dioxide, 500 ppm of sulfur dioxide, 200 ppm (by volume) of ammonia, and 10 vol % of water. With regard to the test gas, water and a mixture of the above-mentioned gases (nitrogen, carbon dioxide, oxygen, nitrogen monoxide, nitrogen dioxide, sulfur dioxide, and ammonia) were prepared, separately, and they were mixed in a tube upon testing. The gas analyzer used was "MEXA9100EGR" (trade name), product of HORIBA. The space velocity of the test gas when the gas was allowed to flow through the test specimen was 80000 (hour$^{-1}$).

The "percent $NO_x$ purification" in Table 2 is obtained by subtracting the "$NO_x$ amount of the exhaust gas from the test specimen" from the $NO_x$ amount of the test gas, and then dividing the thus obtained difference by the $NO_x$ amount of the test gas, and centupling the quotient. The "percent $NO_x$ purification" was measured immediately after the test was started and ten hours after the test was started (10 hours later).

[Pressure Loss]

Under room temperature conditions, air was allowed to flow through the sample (honeycomb catalyst body) at a flow rate of 0.5 m³/min and a difference in pressure between the pressure upstream of the sample and that downstream of the sample (difference between the pressure on the air inflow side and the pressure on the air outflow side) was measured. In such a manner, a pressure loss was calculated.

The present invention can be used as a honeycomb catalyst body with zeolite, vanadia, and titania loaded thereon or with zeolite, a composite oxide of titania and tungsten oxide, and vanadia loaded thereon which can be used for selective catalytic reduction (SCR) of $NO_x$.

DESCRIPTION REFERENCE SYMBOLS

3: first end face, 5: second end face, 7: cell, 9: partition wall, 10: honeycomb structure body, 11: base layer, 15: coat layer, 17: outer peripheral wall, 21: partition wall, 23: support layer, 25: intermediate layer, 27: coat layer, 35: honeycomb structure body, 50: honeycomb catalyst body, 55: honeycomb catalyst body.

What is claimed is:

1. A honeycomb catalyst body comprising:
a honeycomb structural body having partition walls that define a plurality of cells extending from a first end face as one of the end faces to a second end face as the other end face, and serving as through channels of a fluid,
the partition walls each having a support layer composed of 50 mass % or more of ceramic, an intermediate layer with which the surface of the support layer is coated and that contains from 50 to 95 mass % of zeolite, and a coat layer with which the surface of the intermediate layer is coated, and
the coat layer being either a coat layer (A) containing vanadia and titania, or a coat layer (B) containing vanadia and a composite oxide of titania and tungsten oxide, wherein the coat layer contains from 1 to 5 mass % vanadia and has a thickness of from 1 μm to 50 μm.

2. The honeycomb catalyst body according to claim 1, wherein the honeycomb structure body has an effective GSA (geometrical surface area) of from 10 to 50 cm$^2$/cm$^3$.

3. The honeycomb catalyst body according to claim 2, wherein a ratio of the mass of the zeolite to a total of the mass of the vanadia and the mass of the titania in the coat layer (A) {(mass of zeolite):(total of mass of vanadia and mass of titania)} contained in the honeycomb structure body is from 99:1 to 60:40; or a ratio of the mass of the zeolite to a total of the mass of the vanadia, the mass of the titania, and the mass of the tungsten oxide in the coat layer (B) {(mass of zeolite):(total of mass of vanadia, mass of titania, and mass of tungsten oxide)} contained in the honeycomb structure body is from 99:1 to 60:40.

4. The honeycomb catalyst body according to claim 3, wherein the honeycomb structure body has a thermal expansion coefficient at from 40 to 800° C. of 1.0 ppm/K or less.

5. The honeycomb catalyst body according to claim 2, wherein the honeycomb structure body has a thermal expansion coefficient at from 40 to 800° C. of 1.0 ppm/K or less.

6. The honeycomb catalyst body according to claim 1, wherein a ratio of the mass of the zeolite to a total of the mass of the vanadia and the mass of the titania in the coat layer (A) {(mass of zeolite):(total of mass of vanadia and mass of titania)} contained in the honeycomb structure body is from 99:1 to 60:40; or a ratio of the mass of the zeolite to a total of the mass of the vanadia, the mass of the titania, and the mass of the tungsten oxide in the coat layer (B) {(mass of zeolite):(total of mass of vanadia, mass of titania, and mass of tungsten oxide)} contained in the honeycomb structure body is from 99:1 to 60:40.

7. The honeycomb catalyst body according to claim 6, wherein the honeycomb structure body has a thermal expansion coefficient at from 40 to 800° C. of 1.0 ppm/K or less.

8. The honeycomb catalyst body according to claim 1, wherein the honeycomb structure body has a thermal expansion coefficient at from 40 to 800° C. of 1.0 ppm/K or less.

9. The honeycomb catalyst body according to claim 1, wherein the coat layer contains from 1 to 30 mass % of an inorganic binder that does not disappear at 500° C. or less.

* * * * *